US012579617B2

(12) United States Patent
Müller et al.

(10) Patent No.: US 12,579,617 B2
(45) Date of Patent: Mar. 17, 2026

(54) DETECTION OF OBJECTS OF A MOVING OBJECT STREAM

(71) Applicant: SICK AG, Waldkirch (DE)

(72) Inventors: Romain Müller, Waldkirch (DE); Dirk Strohmeier, Waldkirch (DE)

(73) Assignee: SICK AG, Waldkirch (DE)

( * ) Notice: Subject to any disclaimer, the term of this patent is extended or adjusted under 35 U.S.C. 154(b) by 271 days.

(21) Appl. No.: 18/382,213

(22) Filed: Oct. 20, 2023

(65) Prior Publication Data

US 2024/0135500 A1    Apr. 25, 2024
US 2024/0233087 A9    Jul. 11, 2024

(30) Foreign Application Priority Data

Oct. 21, 2022    (EP) ..................................... 22203115

(51) Int. Cl.
*G06K 7/10*    (2006.01)
*G06K 7/14*    (2006.01)
*G06T 5/50*    (2006.01)
*G06T 5/73*    (2024.01)
*G06T 5/80*    (2024.01)
(Continued)

(52) U.S. Cl.
CPC ............ *G06T 5/50* (2013.01); *G06K 7/10722* (2013.01); *G06K 7/1413* (2013.01); *G06K 7/1417* (2013.01); *G06T 5/73* (2024.01); *G06T 5/80* (2024.01); *G06T 7/246* (2017.01); *H04N 5/2624* (2013.01); *H04N 23/81* (2023.01); *H04N 25/76* (2023.01); *G06T 2207/20201* (2013.01); *G06T 2207/20212* (2013.01)

(58) Field of Classification Search
CPC ......................... G06K 7/10722; H04N 25/773
USPC ....................................................... 235/462.01
See application file for complete search history.

(56) References Cited

U.S. PATENT DOCUMENTS 8,749,649 B1    6/2014    Linzer
9,831,283 B2    11/2017    Shepard et al.
(Continued)

FOREIGN PATENT DOCUMENTS

EP    2284764 B1    3/2012

OTHER PUBLICATIONS

Gyongy, et al.; "Object Tracking and Reconstruction with a Quanta Image Sensor." Paper presented at International Image Sensor Workshop 2017, Hiroshima, Japan, May 30, 2017 Jun. 2, 2017.
(Continued)

*Primary Examiner* — Toan C Ly
(74) *Attorney, Agent, or Firm* — Nath, Goldberg & Meyer; Jerald L. Meyer

(57) ABSTRACT

A camera device is provided that has an image sensor having a plurality of pixel elements for recording image data of an object stream of objects moving in a direction of movement relative to the camera device and a control and evaluation unit that is configured to read and further process the image data from the image sensor, wherein the image sensor is configured as a high frequency binary image sensor that generates individual images of low bit depth at a high frame rate, In this respect, the control and evaluation unit is configured to trigger a plurality of repeated shots of individual images of the image sensor and to combine the individual images while compensating the movement of the object stream between the shots to form a common image.

18 Claims, 4 Drawing Sheets

Figure 1:
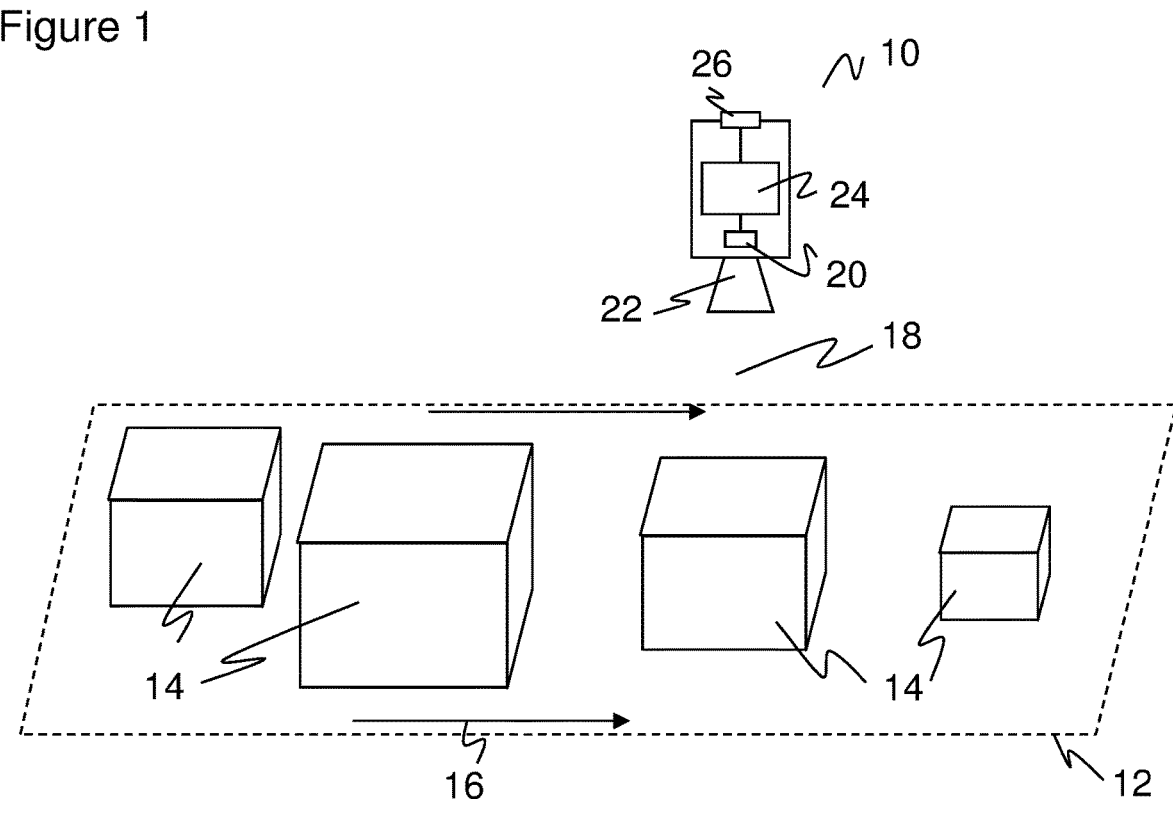

(51) Int. Cl.

| | |
|---|---|
| *G06T 7/246* | (2017.01) |
| *H04N 5/262* | (2006.01) |
| *H04N 23/81* | (2023.01) |
| *H04N 25/76* | (2023.01) |
| *H04N 25/773* | (2023.01) |

(56) References Cited

U.S. PATENT DOCUMENTS

| | | | |
|---|---|---|---|
| 11,534,923 B1 * | 12/2022 | De Arruda Camargo Polido ....... | |
| | | | B25J 9/1674 |
| 2006/0249581 A1 | 11/2006 | Smith | |
| 2020/0284883 A1 * | 9/2020 | Ferreira ................ | G01S 7/4815 |
| 2021/0356268 A1 | 11/2021 | Müller et al. | |

OTHER PUBLICATIONS

Iwabuchi, et al.; "Iterative Image Reconstruction for Quanta Image Sensor by using Variance-based Motion Estimation." Graduate School of tn.grntee:rm:g, Tokyo University of Science 6-3-1 Niijuku, Katsushika, Tokyo, 125-8585 Japan, Dec. 1, 2019.

\* cited by examiner

DETECTION OF OBJECTS OF A MOVING OBJECT STREAM

The invention relates to a camera device and to a method for detecting objects of an object stream moving in a direction of movement respectively.

The optical detection of an object stream is an important application case for automation work in industry or logistics. The objects are frequently conveyed between different process steps on a conveyor belt system. A specific application example among many is the sorting of parcels or other objects. Identification takes place here as a rule by reading an optical code. In other applications, for example quality assurance, codes are not read, but rather other image features are evaluated. It is known in the prior art to associate an additional sensor, such as a laser scanner that takes over a supplementary geometry measurement beforehand, with the camera.

A CMOS image sensor is typically used for the image capturing. It records images at a specific frame rate and for this purpose integrates all the charges within an exposure time that are produced by incident photons. A sufficiently long exposure time in which sufficient charges can be accumulated should be selected to achieve a favorable signal-to-noise ratio. However, this can produce a blur in the image (motion blur) in a dynamic scene. This impairs the quality of the further image processing. The reading rate specifically degrades during code reading. A shorter exposure time would reduce the motion blur, but only at the named cost of a degraded signal-to-noise ratio. The signal-to-noise ratio could likewise be improved by the grouping together (binning) of pixels, but resolution is thereby lost.

There are approaches in the prior art to compensate the motion blur. A photo camera is presented in U.S. Pat. No. 8,749,649 B1, for example, that has image stabilization, that records a plurality of frames, and that combines them with a noise suppression technique. This is, however, on the one hand, not a suitable camera for the applications named in the introduction. In addition, it does not alter the basic technical problem that the exposure time can only provide either a good signal-to-noise ratio or small motion blur. EP 2 284 764 B1 deals with a recording system for capturing sharp barcode images despite any motion. It calculates a multiexposure sequence and thus captures an image of a 2D barcode, estimates the blur, and amplifies the contrast based on the estimated blur. The basis problem of image capturing is not looked at here either.

More recently, cameras have been developed that are able to detect single photons. So-called SPAD (single photon avalanche diode) image sensors can be named as an approach here, for example of the companies Canon or ST. They are typically operated with pulsed semiconductor light sources to acquire depth information using a time of flight (TOF) process. SPAD image sensors can, however, also be used to record 2D images in dark environments using the respectively acquired intensity. U.S. Pat. No. 9,831,283 B2 describes a SPAD image sensor in fluorescence lifetime microscopy.

With a QIS (quanta image sensor) of Gigajot, for example, the photodiode is optimized for particularly low noise. A number of individual images are recorded within a very short time and the individual images are processed to form a total image. An example overview article of this technology is Ma, Jiaju et al., "Review of Quanta Image Sensors for Ultralow-Light Imaging", IEEE Transactions on Electron Devices 69.6 (2022): 2824-2839.

With its qCMOS® image sensor (quantitative CMOS), the company of Hamamatus has found optimizations that enable the detection of single photons. However, this camera is primarily used in static applications with little light with a long exposure time and it cannot deliver images fast. The qCMOS® technology is presented on the website of Hamamatsu in a white paper "qCMOS®: Quantitative CMOS technology enabled by Photon Number Resolving".

There have previously not been any approaches in the initially named applications to provide that a single photon camera will be practically usable therein and that it solves the described problems of conventional cameras.

It is therefore the object of the invention to improve the capturing of moving objects.

This object is satisfied by a camera device and by a method for capturing objects in accordance with the respective independent claim. The camera device has an image sensor having a plurality of pixel elements, for example in a linear or matrix arrangement. Image data of an object stream of objects that move relative to the camera are thus recorded. A control and evaluation unit reads the image data and further processes them. The image sensor is a high frequency binary image sensor and is thus able to record images at a very high frame rate and with very short exposure times. Typical time scales are under one millisecond, in the range of some hundred, or ten, or some microseconds, or even in the microsecond range. These images, however, only have a very small bit depth or are even only simple black and white images having only two possible states of the pixel elements. Different technologies for image sensors have been named in the introduction that have the properties of a high frequency binary image sensor.

The invention starts from the basic idea of triggering a plurality of repeated shots of individual images. A very large number of hundreds or thousands of images per second can be recorded due to the extreme speed of high frequency binary image sensors. Numerous individual images are thus initially captured as image data. The individual images with their low bit depth have a large amount of noise because every single interfering photon or dark event can also result in a detection in the affected pixel element. A large number of individual images are therefore combined into one common image. This would naively result in a heavily blurred image due to the movement of the object stream. The combination of the individual images into the common image therefore takes place while compensating for the interim movement of the object stream between the respective shots.

The invention has the advantage that a long integration time is effectively achieved by the large number of individual images since individual images can be collected as long as the object is in the field of view. There are very many individual images at practically relevant speeds of movement of the object stream due to the extremely short exposure time for an individual image. A particularly favorable signal-to-noise ratio of the common image results from this overall. No compromise with respect to image definition has to be accepted for this since the motion blur is suppressed in the combination into the common image. Finally, unfavorable reflection conditions can at best be expected for some of the individual images since the relative position of the recorded object with the individual images changes over and over again as the movement of the object stream progresses. In accordance with the invention, fewer reflection properties therefore also occur.

The image sensor is preferably formed as a SPAD (single photon avalanche diode) image sensor or as a QIS (quanta image sensor) image sensor. These are examples for high frequency binary image sensors that are available on the market and can thus be directly made use of. Reference is made to the respective initially cited literature in this respect for further technical features. A SPAD image sensor can specifically work with exposure times that go down to a few nanoseconds, but, on the other hand, also only delivers the purely binary information in its respective pixel elements whether a photon has been detected or not.

The individual images are preferably binary images or quasi-binary images having at most ten counter states of the pixel elements. A binary image is, for example, represented as a black and white image and comprises the binary information in its pixels whether a photon has been detected or not. A multibit counter per pixel is conceivable as an alternative that effectively records an individual image that is resolved in very few gray stages and can thus be understood as quasi-binary. Only 0 . . . x states with a small x are distinguished here, for example x=2, 3, 4, 8, 10, 16, 20, 32, 50 or 64. In this generalization, the case x=1 corresponds to the binary image having a one bit "counter" that can only distinguish 0 and 1.

The movement of the object stream is preferably uniform. This is a practically very relevant case that represents a very simplified compensation problem due to a fixed speed v=const that is additionally only one dimensional due to a fixed direction of movement.

The camera device is particularly preferably installed as stationary at a conveying device on which the objects are conveyed. This is a particularly important group of applications. The conveyed objects form the object stream. Its direction of movement and as a rule constant speed are fixed by the conveying device or by the conveyor belt.

The speed of the objects is preferably predefined for the control and evaluation unit, in particular by parameterization or connection to a further sensor or to a superior control. This is one of several possibilities to be aware of the speed as an important factor of the compensation of the movement. Conclusions can be drawn from the actual speed of the object in the world on the movement of the corresponding shot of the object in the individual images. This speed is known in advance in some embodiments and can be parameterized, for instance at a fixed conveying speed. It is alternatively conceivable that this is measured externally, for example using incremental encoders at a conveyor belt or that a conveyor control transfers the speed at which the object stream is also moved.

The control and evaluation unit is advantageously configured to determine the speed of the objects from the image data. In particular a reference object is observed at a known distance for this purpose, in particular a conveyor belt. The speed thus determined is the actual speed in the world as a basis for a later determination of the speed of recorded object structures in the individual images.

The control and evaluation unit is preferably configured to determine the movement of the object stream from the speed of the movement of a recorded object of the moving object stream and geometrical and optical parameters. Quite independent of the image contents of the individual images, an object structure can thus be tracked over the individual images and the respective offset by the movement of the object stream can be compensated. This is done with knowledge of the actual speed of the objects in the object stream and of the geometrical and optical conditions. The camera position relative to the object stream and in particular a respective object distance count as geometrical parameters. This can be measured by an integrated or additional geometry sensor already mentioned in the introduction; geometrical parameters such as the pose of the camera device can in some cases be acquired by calibration. The optical parameters, in particular of a camera objective, are known, for example, from a specification or are likewise determined by calibration.

The control and evaluation unit is preferably configured to differently compensate the movement of the object stream for different image regions of the individual images, in particular to compensate regions of interest with different objects. It is taken into account in this embodiment that the movement of the object stream can have different effects in different sections of the individual images. This in particular applies to the case of a plurality of objects in the same individual image that have different distances from the camera device. A near object at a short distance appears to move faster from individual image to individual image than a far object at a greater distance. A restriction to regions of interest (ROIs) additionally has the advantage that less processing effort is necessary. Motion blur outside the regions of interest then possibly remains uncompensated or insufficiently compensated, but also does not play any practical role.

The control and evaluation unit is preferably configured to adapt the compensation of the movement to compensate lens defects and/or projective distortion to the respective position within the individual images, in particular with a different compensation depending on the distance from the image center.

Aberrations of the objective and distortion due to the projective camera perspective can likewise have the result that the offset required for a compensation of the movement of the object stream varies over an individual image. A different offset in the image center with respect to the image edge must therefore in particular be considered for a particularly effective compensation. This can be done in only two discrete steps of image center to image edge or with a finer gradation up to a distance function from the image center.

The control and evaluation unit is preferably configured to determine effects of the movement of the object stream on the individual images from a correlation of the individual images. Embodiments have been described up to now that estimate an offset of object structures that occurs over the individual images due to the movement of the object stream from the aspect of physics, that is the actual speed of the object stream and of the geometrical and optical parameters of the shot. It is alternatively or additionally possible to locate image features over individual images and to place them over one another when combining individual images. Correspondences are located or correlations calculated for this purpose.

The control and evaluation unit is preferably configured to sum the individual images over pixel elements transversely to the direction of movement and thus only to determine a one-dimensional correlation. In illustrative terms, the individual images are added column-wise and are thus projected onto a row when the row direction of the image sensor corresponds, without any restriction of generality, to the direction of movement of the object stream. After this summing, only a one-dimensional correlation between the individual images compressed in this manner has to be determined with a substantially reduced effort to determine the required offset for the compensation of the movement of the object stream.

The control and evaluation unit is preferably configured to record individual images over and over again as long as an object is in the field of view of the camera device. Conventionally, only a single image of the respective object is recorded with a comparatively long exposure time as soon as it is in a favorable, typically central position in the field of view in the course of the movement of the object stream. Depending on the circumstances, a plurality of images, but at least a few images, are also recorded. The individual images recorded in accordance with the invention, in contrast, have an extremely short exposure time and are binary or quasi-binary. The respective offset due to the interim further movement of the object stream is anyway compensated. A time interval that is very long in comparison with the exposure time of an individual image is available to record a large number of individual images of an object until it has again departed from the field of view. It is not absolutely necessary to utilize the total available time; more than 20%, 50%, or 80% thereof is also sufficient, for example. Dozens or hundreds of individual images of an object in the field of view can thus be captured before it has departed from the field of view again. This in particular has advantages with reflections. If, as conventionally, only a single image is recorded, it may be heavily overexposed under unfavorable reflection conditions. This will, however, relate to at most a small portion of the large number of individual images recorded and combined in accordance with the invention so that the common image will still remain evaluable.

The control and evaluation unit is preferably configured to identify code regions in the common image and to read their code content. The camera device thus becomes a camera-based code reader for barcodes and/or 2D codes according to various standards, optionally also for text recognition (optical character recognition, OCR). It is particularly important in code reading applications that all the code regions are recorded in high quality.

The method in accordance with the invention can be further developed in a similar manner and shows similar advantages in so doing. Such advantageous features are described in an exemplary, but not exclusive manner in the subordinate claims dependent on the independent claims.

Figure 2:
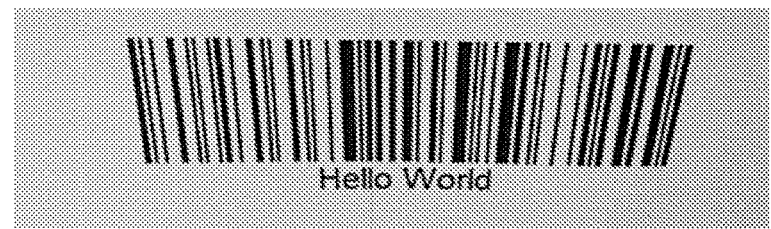
Figure 3:
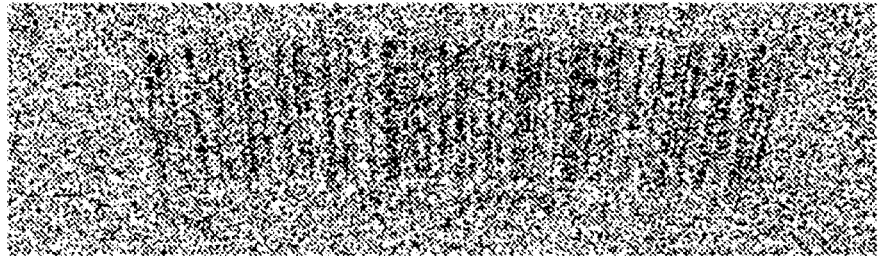
Figure 4:
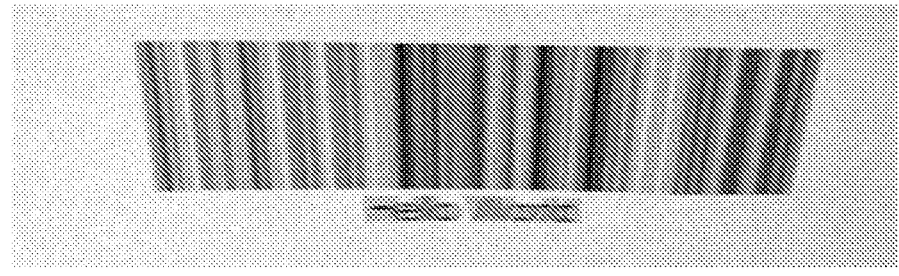
Figure 5:
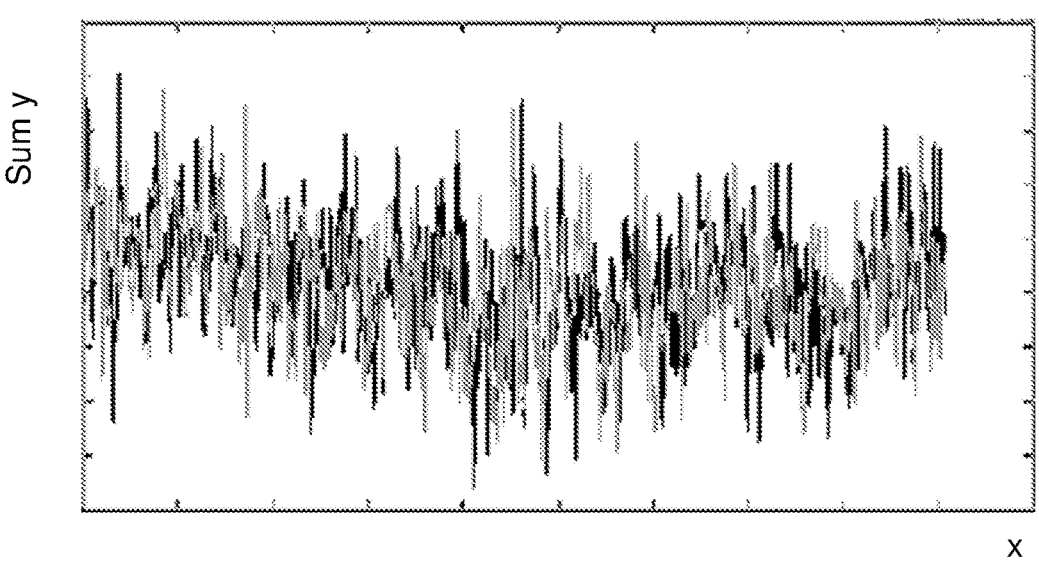
Figure 6:
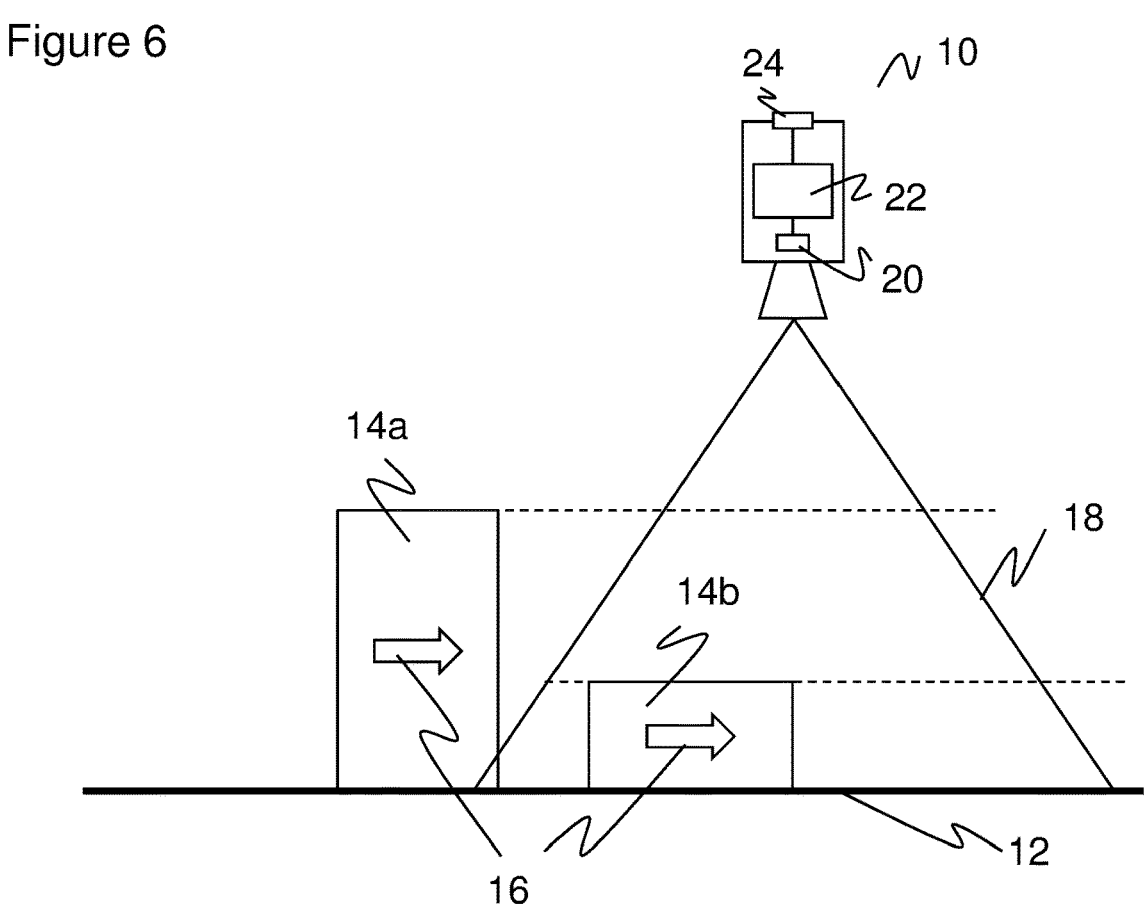
Figure 7:
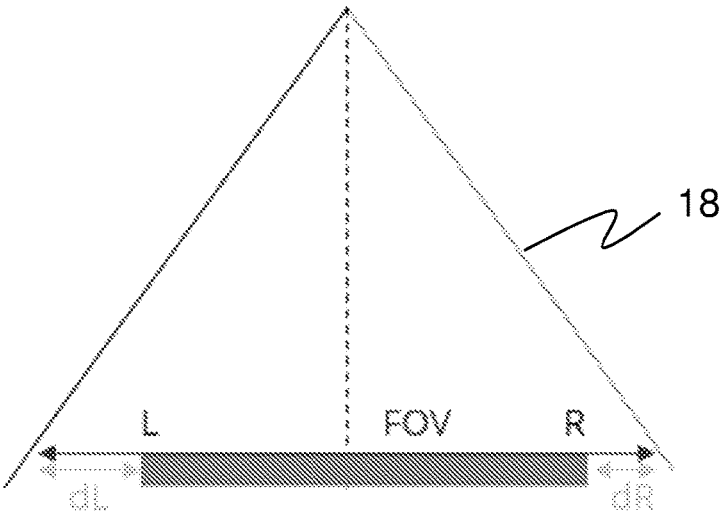
Figure 8:
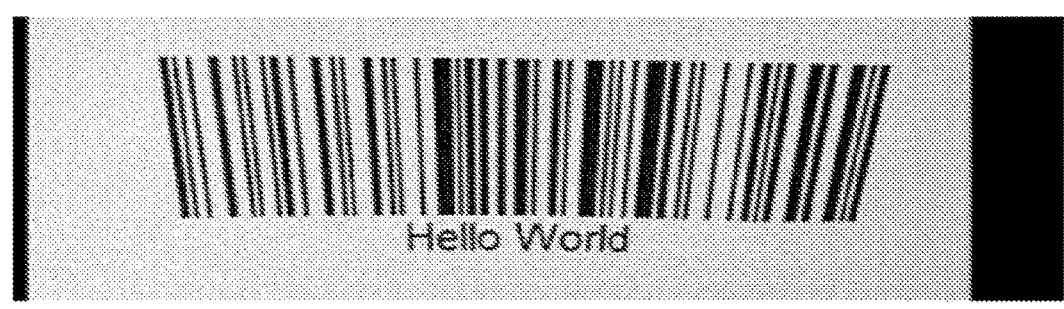

The invention will be explained in more detail in the following also with respect to further features and advantages by way of example with reference to embodiments and to the enclosed drawing. The Figures of the drawing show in:

FIG. 1 a representation of a camera that is installed above a conveying device with objects conveyed thereon;

FIG. 2 an example for a code to be read;

FIG. 3 an exemplary individual image of the code in accordance with FIG. 2 that was recorded by a high frequency binary image sensor;

FIG. 4 a common image, that is still clearly blurred due to motion blur, by a combination of a plurality of individual images in accordance with FIG. 3;

FIG. 5 a representation of the pixel values of two individual images summed column-wise to illustrate how an offset of the individual images due to an interim movement can be determined by means of correlation;

FIG. 6 a schematic sectional view of the field of view of a camera through which the objects of different heights are conveyed;

FIG. 7 a schematic representation of the field of view of a camera to illustrate the determination of the offset between two individual images required for the compensation; and FIG. 8 a common image from a combination of a plurality of individual images in accordance with FIG. 3, now with a compensation of the movement of the object stream between two shots of individual images.

FIG. 1 shows a camera 10 which is installed above a conveyor belt 12 which conveys objects 14 through the field of view 18 of the camera 10, as indicated by the arrow 16. This stationary use of the camera 10 at a conveyor belt is a frequent case from practice. The invention, however, initially relates to the camera 10 itself that observes the objects 14 in an object stream of any cause so that neither the particularly advantageous perspective from above nor the application example in total may be understood as restrictive.

The camera 10 captures image information of the conveyed objects 14 using an image sensor 20 via an objective 22 of any design known per se only shown purely schematically. The image sensor 20 as a rule comprises a matrix arrangement or row arrangement of pixels. The special feature of the image sensor 20 used in accordance with the invention is that it is a high frequency binary image sensor. Unlike a conventional image sensor, it is not charges in the respective pixels that are collected over a certain integration window, but so-to-say only individual events in the form of incident photons, either binarily registered or counted in a multibit counter. Some exemplary technologies for this were briefly presented in the discussion of the prior art, namely a SPAD (single photon avalanche diode) image sensor or a QIS (quanta image sensor) image sensor. Further advantageous technical features of a high frequency binary image sensor can in particular be seen from the documents cited in the introduction.

The actual task of the camera 10 plays a secondary role for the explanation of the invention. It is in any case an image evaluation that requires high quality shots. The objects 14 are tested or measured for specific features, for example. A further development as a camera based code reader is in particular conceivable with which then code regions on the objects 14 are detected and the codes applied there are read.

A control and evaluation unit 24 is connected for such image evaluations to the image sensor 20 that triggers its shots, and that reads and further processes the respective image information. The control and evaluation unit 24 has at least one digital processing module such as at least one microprocessor, at least one FPGA (field programmable gate array), at least one DSP (digital signal processor), at least one ASIC (application specific integrated circuit), at least one VPU (video processing unit), or at least one neural processor. A pre-processing on a separate digital processing module is in particular frequently outsourced in code reading applications for pre-processing steps such as a deblurring, a brightness adaptation, a binarization, a segmentation, the locating of regions of interest (ROIs), especially code regions, and the like. The actual image processing after this pre-processing then preferably takes place in at least one microprocessor. The control and evaluation unit 24 can moreover be provided at least partially external to the camera 10, for instance in a superior control, a connected network, an edge device, or a cloud. The procedure of the control and evaluation unit 24 for capturing high quality images of the moving objects 14 by a high frequency binary image sensor will subsequently be explained in more detail with reference to FIGS. 2 to 8.

The camera 10 outputs information such as image data or evaluation results acquired therefrom via an interface 26. Provided that the functionality of the control and evaluation unit 24 is provided at least partially outside the camera 10, the interface 26 can be used for the communication required for this. Conversely, the camera 10 can receive information from further sensors or from a superior control via the interface 26 or via a further interface. It is thereby possible, for example, to communicate a fixed or current conveying speed of the conveyor belt to the camera 10 or to obtain geometry information on the objects 14, in particular their distance from the camera 10.

FIG. 2 shows an image of an arbitrary code to be read to thus perform the invention closer to the application example of code reading. The shot shown in FIG. 2 has not yet been recorded by a high frequency binary image sensor, but is rather generated by a conventional image sensor in idealized form without motion blur and with a sufficient exposure time and only serves for comparison for a better understanding of the invention.

FIG. 3 shows an exemplary individual image of the code in accordance with FIG. 2 that was recorded by a high frequency binary image sensor; The shot has taken place with a very short exposure time that enables hundreds, thousands, and even more shots in a second. Every pixel binarily recognizes whether a photon has been incident within the very short exposure time or not. A binary image or a black and white image is thereby created. Alternatively, photons are counted in a quasi-binary image with very few gray scales, with counter values 0, 1, 2, . . . , x with a very small natural number x corresponding to the counted photons being able to occur. Great noise is produced by the short exposure time and by the detection of individual photons since, in addition to the actual image features, a substantial random effect plays a role whether a bright environmental structure or code structure has actually produced a photon registered in the associated pixel or a pixel that is actually associated with a dark code structure has registered an event by a stray photon or a dark event. The individual image is unsuitable to read the code. The barcode structures can nevertheless already be recognized by the naked eye.

The approach in accordance with the invention comprises allowing the code structures to clearly come to the fore by summing a large number of zones, hundreds, or even thousands of individual images because the mean of said random effects is then formed. However, the objects 14 in the object stream move in the application situations observed here. A naïve direct summing of individual images therefore produces a common image that also appears very blurred due to motion blur, that is has an insufficient image definition. FIG. 4 shows an example of 10,000 summed individual images that were recorded in motion.

The motion blur can be at least largely eliminated when the respective interim movement of the object 14 is taken into account in the summing of the individual images. The object stream preferably only moves in one direction, as in the conveyor belt application in accordance with FIG. 1, so that only a one-dimensional problem then arises. As a rule here, the speed is moreover constant, with it equally being possible to take a non-constant speed profile into consideration.

There are various possibilities of compensating the movement of the object stream in the combination of the individual images. They can be roughly divided into feature-based processes that are based on image contents of the individual images and into external or physical processes that determine the effects of the movement independently of the image contents of the individual images. The two can also be combined with one another, for example in that the actual movement is used as an indication for the search for corresponding image features in different individual images.

In a feature-based process, an algorithm finds the optimum offset that is applied to an individual image to compensate the movement between the shots of two individual images in the summing. As will be discussed below, it is also conceivable to vary the offset over image zones, for example because a plurality of objects are recorded at different distances and then apparently move through the individual images at different speeds. The algorithm recognizes objects or their characteristic image features in the individual images from which the sought offset results. Suitable processes for this are template matching or correlations. The prior art is aware of a plurality of high quality algorithms for locating or tracking corresponding image features over an image sequence of which use can be made.

There is a fixed direction of movement in a large group of relevant application cases. The correspondence problem or correlation problem is therefore basically one dimensional. To utilize this, the individual images orthogonal to the direction of movement can be summed. In an advantageous implementation, the rows or columns of the image sensor 20 are aligned in the direction of movement such that the summing can take place very simply over the columns and rows. A one-dimensional data field is then produced from every individual image and a cross-correlation can be calculated with little effort on this basis.

FIG. 5 shows two individual images added column-wise in the described manner in gray and black. On the one hand, a certain parallelism can be recognized in the extents so that a cross-correlation allows a maximum to be expected that can be used as the sought offset. On the other hand, very clear, unambiguous features are not necessarily to be expected due to the high noise. This does not only apply to the last-discussed one-dimensional case, but also to all feature-based processes. It can therefore be sensible to replace or supplement a feature-based process with an external or physical process and those processes will now be further described.

FIG. 6 shows, in a manner preparing for this, a schematic sectional view of the field of view 18 of the camera 10 through which the objects 14a-b, two by way of example, are conveyed at different heights. Since the lateral extent of the field of view 18 decreases as the proximity to the camera 10 increases, the speed perceived by the camera 10 for higher objects 14a is greater than for lower objects 14b. It is important here to distinguish between the perceived speed, that is the speed of the object image on the image sensor 14 in pixels/time, and the real speed of the objects 14a-b. The latter is naturally completely independent of the height of the objects 14a-b.

The real speed can be determined in a variety of manners. It is, for example, parameterized, corresponding to the provided conveying speed in the application, is measured by an external sensor, in particular an incremental encoder, or is communicated from a superior control that in turn predefines the speed or measures it with its own sensors. It is also conceivable to provide the conveyor belt 12 with optical markers in a calibration phase and to measure their perceived speed with a feature-based process that works very accurately under such favorable conditions. Since the distance of the camera 10 from the conveyor belt 12 is known, this perceived speed can be converted into the real speed. The optical markers make it possible to reliably recognize the otherwise structureless conveyor belt 12. Active markers, for instance with the LEDs running along with the conveyor belt, preferably serve this purpose. They can even produce an unambiguously recognizable optical code, for instance a flashing sequence, with a regular repetition at a specific frequency often being sufficient.

The perceived speed of the respective objects 14a-b in the respective application situation is sought, in contrast, since the offset of object structures between two individual images can be directly derived from this. Feature-based processes were described with this aim above. With knowledge of the geometrical parameters of the camera 10 and its position and alignment with respect to the objects 14a-b and the optical parameters of the camera 10, a conclusion can be drawn on the perceived speed from the real speed in an external or physical process. Geometrical and optical parameters are acquired by a calibration or by a parameterization in this respect. Distances and geometries can moreover be measured continuously by an integrated or external distance sensor, in particular an upstream laser scanner. The information when an object 14a-b starts and stops or enters into the field of view 18 and departs from it again can also be acquired from this. Any time offset between geometrical measurements and shots of individual images is simple to compensate with knowledge of the movement speed.

For this purpose, FIG. 7 again shows a schematic representation of the field of view 18 of the camera 10. What is sought is the perceived object speed in pixel/s that depends on the objective 22 used, on the distance of the respective object 14a-b from the camera, 10 and the real speed of the object 14a-b.

$FOV(1\ pixel)=(d/f-1)*pixel\ pitch$ at d object distance and f focal length of the objective 22, and $FOV(1\ pixel)/v=t/pixel$.
applies here.

$$v_{pixel}=dx_{pixel}/dt=1\ pixel*v_{obj}/FOV=1\ pixel*v_{obj}/((d/f-1)*pixSize)$$

follows from this for the perceived object speed $v_{pixel}$ in pixel/s.

where $v_{obj}$ is the real speed of the object in m/s and pixSize is the size of the pixel.

With an upstream geometry measurement or distance measurement, a start signal for the entry into the field of view 18 and an end signal for the departure corresponding to the positions of the geometry sensor and the camera 10 are to be adapted by a time delay. It amounts to $dT=v_{obj}/dX$ for the start signal, where dX is the distance between the start of the field of view 18 and the geometry sensor or $dT=v_{obj}/(dX+FOV)$ for the end signal with an additional taking into account of the width FOV of the field of view 18. An at least approximately constant real speed $v_{obj}$ may be assumed in typical applications.

It is now known by this which pixel rows are of interest in which time for which object 14a-b. These data can still be translated into pixel rows using the geometry information L and R by which, viewed in the direction of movement, the left and right edges of the object 14-b are indicated.

The field of view of the camera 10 is given in dependence on the number of pixels pixNum in a camera row by $Fov_{tot}=(d/f-1)*pixSize*pixNum$.

L and R are given in meters or in another known unit of length. The geometrical parameters that define the relationship between L and R and the optical axis of the camera 10, that represents the center of the field of view, are known in that they are parameterized or are determined in preparation. L and R can now be translated into $FOV_{tot}$ via this relation and differences dR and dL with respect to the field of view can thus be determined. The pixels between pixelStart and pixelEnd that correspond to the object 14a-b at the current point in time and thus in the individual image can in turn be determined from this:

$$pixelStart=pixNum*dL/FOV(1Pix)=dL*1\ pix*v_{obj}/((d/f-1)*pixSize)\ and\ pixelEnd=pixNum(1-dR/FOV(1Pix))=pixNum(1-dR/((d/f-1)*pixSize)).$$

It is thus known which regions have to be displaced with which offset in the individual images before they are added for combination into a common image.

FIG. 8 shows a common image that has been produced from a plurality of individual images in accordance with FIG. 3, with now one of the described compensations for the interim movement of the objects 14a-b having taken place for every added individual image, by means of a physical process in the example shown. The image quality is similar to the comparison image of FIG. 2; the motion blur in accordance with FIG. 4 has been eliminated. A decoder can work without problem with the common image of FIG. 8.

A special feature in this procedure is that data can be collected continuously in the form of individual images as long as an object 14a-b is in the field of view 18. In contrast, only an instantaneous shot is produced in a fixed position using a conventional image sensor. The continuous multiple recording of individual images is in particular advantageous with direct reflections. This only occurs locally at a certain position of the object 14a-b and is therefore suppressed in the common image. If, in contrast, the unfavorable position with the direct reflection was actually the recording position, the image data are unusable and the code could not be read.

As already signposted in connection with the explanations on FIGS. 6 and 7, the offset between the individual images is not necessarily a single global offset of the total individual image. This is possible, but is a simplification. If a plurality of objects 14a-b are simultaneously recorded at different distances such as at a somewhat later point in time of the situation of FIG. 6, each object 14a-b should preferably compensate its own offset. The compensation then takes place differently per image zone, in particular per region of interest with a respective object 14a-b.

The offset can additionally or alternatively or for another reason be determined and can be taken into account locally per image region of the individual image, namely due to lens defects or to projective distortion. This has the result that, with a speed at the image edge that is the same per se, a different offset is produced than at the image center and if this is compensated, the common image that is produced is of even higher quality.

The invention claimed is:

1. A camera device that has an image sensor having a plurality of pixel elements for recording image data of an object stream of objects moving in a direction of movement relative to the camera device and a control and evaluation unit that is configured to read and further process the image data from the image sensor, wherein the image sensor is configured as a high frequency binary image sensor that generates individual images of low bit depth at a high frame rate, wherein the control and evaluation unit is configured to trigger a plurality of repeated shots of individual images of the image sensor and to combine the individual images while compensating the movement of the object stream between the shots to form a common image, and wherein the speed of the objects is predefined for the control and evaluation unit.

2. The camera device in accordance with claim 1, wherein the image sensor is configured as a SPAD image sensor or QIS image sensor.

3. The camera device in accordance with claim 1, wherein the individual images are binary images or quasi-binary images having at most ten counter states of the pixel elements.

4. The camera device in accordance with claim 1, wherein the movement of the object stream is uniform.

5. The camera device in accordance with claim 1, that is installed as stationary at a conveying device on which the objects are conveyed.

6. The camera device in accordance with claim 1, wherein the speed of the objects is predefined for the control and evaluation unit by parameterization or connection to a further sensor or to a superior control.

7. The camera device in accordance with claim 1, wherein the control and evaluation unit is configured to determine the speed of the objects from the image data.

8. The camera device in accordance with claim 1, wherein the control and evaluation unit is configured to determine the movement of the object stream from the speed of the movement of a recorded object of the moving object stream and geometrical and optical parameters.

9. The camera device in accordance with claim 1, wherein the control and evaluation unit is configured to differently compensate the movement of the object stream for different image regions of the individual images.

10. The camera device in accordance with claim 9, wherein the control and evaluation unit is configured to differently compensate the movement of the object stream for different regions of interest with different objects.

11. The camera device in accordance with claim 1, wherein the control and evaluation unit is configured to determine effects of the movement of the object stream on the individual images from a correlation of the individual images.

12. The camera device in accordance with claim 11, wherein the control and evaluation unit is configured to sum the individual images over pixel elements transversely to the direction of movement and thus only to determine a one-dimensional correlation.

13. The camera device in accordance with claim 1, wherein the control and evaluation unit is configured to record individual images over and over again as long as an object is in the field of view of the camera device.

14. The camera device in accordance with claim 1, wherein the control and evaluation unit is configured to identify code regions in the common image and to read their code content.

15. A camera device that has an image sensor having a plurality of pixel elements for recording image data of an object stream of objects moving in a direction of movement relative to the camera device and a control and evaluation unit that is configured to read and further process the image data from the image sensor, wherein the image sensor is configured as a high frequency binary image sensor that generates individual images of low bit depth at a high frame rate, wherein the control and evaluation unit is configured to trigger a plurality of repeated shots of individual images of the image sensor and to combine the individual images while compensating the movement of the object stream between the shots to form a common image, and wherein the control and evaluation unit is configured to adapt the compensation of the movement to compensate lens defects and/or projective distortion to the respective position within the individual images.

16. The camera device in accordance with claim 15, wherein the control and evaluation unit is configured to adapt the compensation of the movement to compensate lens defects and/or projective distortion to the respective position within the individual images with a different compensation depending on the distance from the image center.

17. A method of detecting objects of an object stream moving in a direction of movement in which image data of the object stream are recorded and evaluated by an image sensor with a plurality of pixel elements, wherein the image sensor is configured as a high frequency binary image sensor that generates individual images of low bit depth at a high frame rate, wherein a plurality of repeated shots of individual images of the image sensor are generated and the individual images are combined while compensating the movement of the object stream between the shots to form a common image, and wherein the speed of the objects is predefined for the control and evaluation unit.

18. The method in accordance with claim 17, wherein the speed of the objects is predefined for the control and evaluation unit by parameterization or connection to a further sensor or to a superior control.

* * * * *